US012614452B2

(12) United States Patent
Bandi et al.

(10) Patent No.: US 12,614,452 B2
(45) Date of Patent: Apr. 28, 2026

(54) CONNECTED VEHICLE CONTROL

(71) Applicant: Ford Global Technologies, LLC, Dearborn, MI (US)

(72) Inventors: Krishna Bandi, Farmington Hills, MI (US); Sathyanarayana Chary Palakonda, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 18/529,209

(22) Filed: Dec. 5, 2023

(65) Prior Publication Data

US 2025/0182619 A1 Jun. 5, 2025

(51) Int. Cl.
| | |
|---|---|
| *G08G 1/0967* | (2006.01) |
| *G08G 1/01* | (2006.01) |
| *H04W 4/44* | (2018.01) |

(52) U.S. Cl.
CPC ..... *G08G 1/096725* (2013.01); *G08G 1/0116* (2013.01); *G08G 1/0129* (2013.01); *G08G 1/0141* (2013.01); *G08G 1/096783* (2013.01); *H04W 4/44* (2018.02); *G08G 1/0112* (2013.01); *G08G 1/096791* (2013.01)

(58) Field of Classification Search
CPC ........... G08G 1/096725; G08G 1/0116; G08G 1/0129; G08G 1/0141; G08G 1/096783; G08G 1/0112; G08G 1/096791; H04W 4/44

See application file for complete search history.

(56) References Cited

U.S. PATENT DOCUMENTS

| | | | | |
|---|---|---|---|---|
| 6,249,232 B1 * | 6/2001 | Tamura | .................. | G08G 1/163 |
| | | | | 340/905 |
| 6,615,137 B2 * | 9/2003 | Lutter | ................... | G08G 1/162 |
| | | | | 340/436 |
| 10,286,913 B2 * | 5/2019 | Saigusa | ............ | B60W 30/0956 |
| 10,351,137 B2 | 7/2019 | Shin | | |
| 11,747,806 B1 * | 9/2023 | Wootton | ............... | G08G 1/161 |
| | | | | 701/28 |

(Continued)

FOREIGN PATENT DOCUMENTS

| | | | | | |
|---|---|---|---|---|---|
| CN | 108447291 A | * | 8/2018 | ....... | G08G 1/096775 |
| CN | 115868182 A | | 3/2023 | | |

(Continued)

OTHER PUBLICATIONS

Translation of CN-108447291-A, 18 pages (Year: 2018).*

(Continued)

*Primary Examiner* — Dale W Hilgendorf
(74) *Attorney, Agent, or Firm* — Frank A. MacKenzie; Brooks Kushman P.C.

(57) ABSTRACT

A computer includes a processor and a memory, and the memory stores instructions executable to receive a message including kinematic states of a plurality of remote vehicles traveling on a road and actuate a component of a host vehicle based on the kinematic states of the remote vehicles from the message. The host vehicle is traveling on the road. The message specifies the kinematic state of each remote vehicle at least partially in terms of a position of the remote vehicle measured relative to a respective lane of the road.

18 Claims, 4 Drawing Sheets

(56) References Cited

U.S. PATENT DOCUMENTS

| | | | | |
|---|---|---|---|---|
| 2003/0016005 | A1* | 1/2003 | Leibowitz | G08G 1/042 |
| | | | | 324/207.16 |
| 2004/0039517 | A1* | 2/2004 | Biesinger | G08G 1/096775 |
| | | | | 340/907 |
| 2007/0043502 | A1* | 2/2007 | Mudalige | G08G 1/163 |
| | | | | 701/93 |
| 2008/0021608 | A1* | 1/2008 | Schmitz | B62D 15/0265 |
| | | | | 701/36 |
| 2010/0256835 | A1 | 10/2010 | Mudalige | |
| 2017/0369067 | A1* | 12/2017 | Saigusa | B60W 30/16 |
| 2018/0047287 | A1* | 2/2018 | Shimotsuma | G06V 20/58 |
| 2018/0192270 | A1* | 7/2018 | Schmitz | H04W 4/38 |
| 2018/0319403 | A1 | 11/2018 | Buburuzan et al. | |
| 2018/0347992 | A1* | 12/2018 | Shimotsuma | G01C 21/3694 |
| 2019/0294167 | A1* | 9/2019 | Kutila | G08G 1/096827 |
| 2020/0269864 | A1* | 8/2020 | Zhang | G08G 1/165 |
| 2021/0248915 | A1 | 8/2021 | Jacobus et al. | |
| 2021/0349463 | A1* | 11/2021 | Kurotobi | B60W 30/18145 |
| 2021/0405641 | A1* | 12/2021 | Agon | B60W 50/00 |
| 2022/0297719 | A1 | 9/2022 | Mittal et al. | |
| 2022/0406182 | A1 | 12/2022 | Gläser et al. | |
| 2023/0050192 | A1* | 2/2023 | Quirynen | G05D 1/0274 |
| 2023/0098231 | A1 | 3/2023 | Avedisov | |
| 2023/0182744 | A1 | 6/2023 | Foster et al. | |
| 2023/0373523 | A1* | 11/2023 | Kassar | B60W 60/0011 |
| 2024/0005782 | A1* | 1/2024 | Yu | G06F 18/25 |
| 2024/0199024 | A1* | 6/2024 | Martin | B60W 30/12 |
| 2025/0136146 | A1* | 5/2025 | Azuma | B60W 30/18018 |

FOREIGN PATENT DOCUMENTS

| | | |
|---|---|---|
| DE | 102018202736 A1 | 8/2019 |
| DE | 102019104778 A1 | 8/2020 |
| DE | 102021107283 A1 | 9/2022 |
| WO | 2022172146 A1 | 8/2022 |

OTHER PUBLICATIONS

Jung, C, et al., "V2X-Communication-Aided Autonomous Driving: System Design and Experimental Validation," sensors, May 20, 2020, 21 pages.

* cited by examiner

400

CONNECTED VEHICLE CONTROL

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
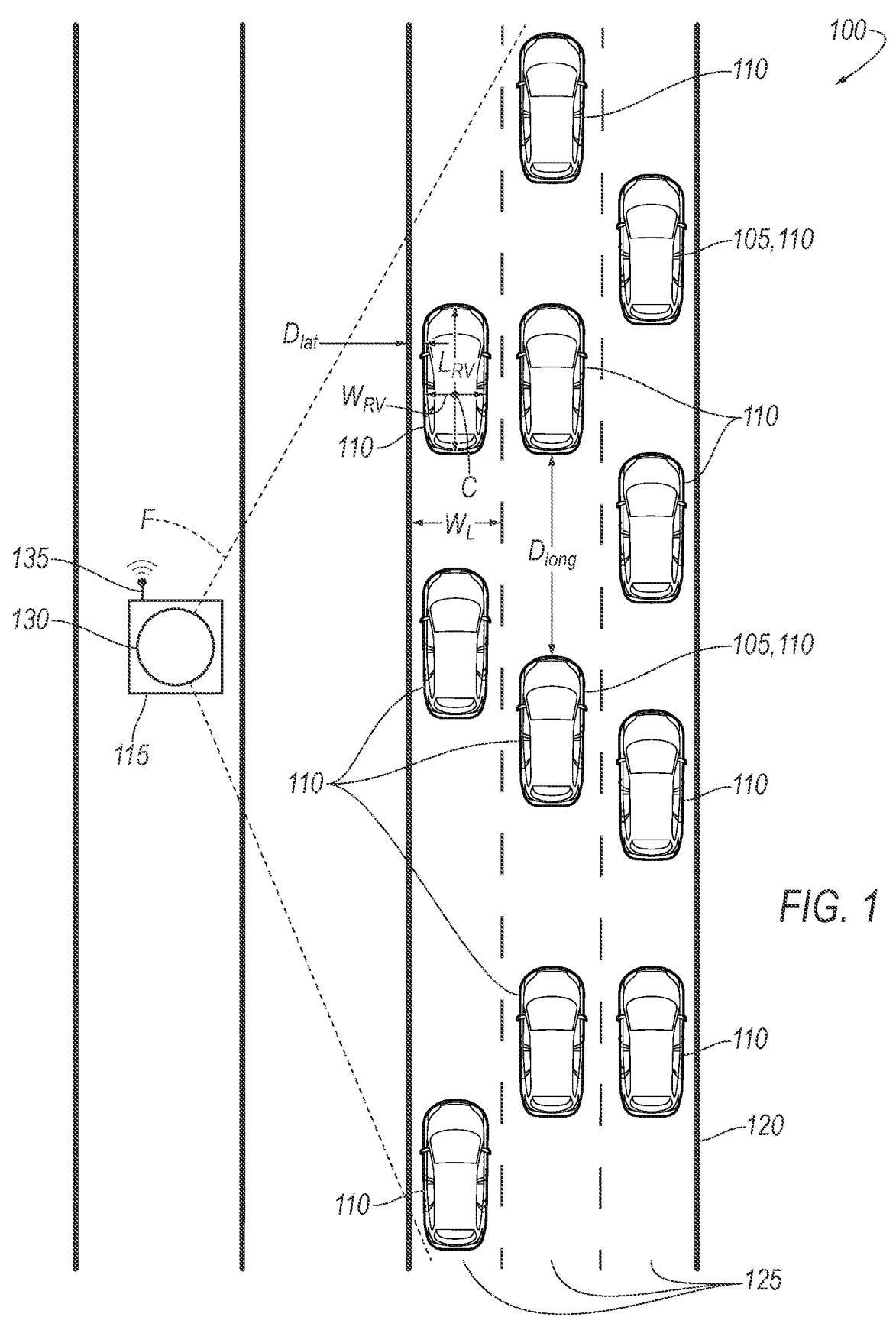
FIG. 1 is a diagrammatic top view of an example system with an infrastructure component and vehicles.

This disclosure provides systems and methods for controlling connected vehicles that are in communication with an infrastructure component. The infrastructure component may include a sensor, a transceiver, and a computer. The sensor has a field of view encompassing a road on which a host vehicle and remote vehicles may travel. The computer generates a message based on data from the sensor and instructs the transceiver to transmit the message to the host vehicle. The message includes kinematic states of the remote vehicles traveling on the road specified at least partially in terms of the positions of the remote vehicles measured relative to respective lanes of the road. For example, the message may include, for each remote vehicle, a lateral offset between a left side of the remote vehicle and a left boundary of the lane in which the remote vehicle is traveling. The host vehicle receives the message and actuates a component based on the kinematic states from the message, e.g., as part of an ADAS feature. Specifying the kinematic states in terms of position relative to the lanes of the road provides a higher degree of localization of the remote vehicles by the host vehicle. This localization may be more accurate and less computationally intensive than the host vehicle comparing on-board sensor data with prestored map data.

A computer includes a processor and a memory, and the memory stores instructions executable to receive a message including kinematic states of a plurality of remote vehicles traveling on a road and actuate a component of a host vehicle based on the kinematic states of the remote vehicles from the message. The host vehicle is traveling on the road. The message specifies the kinematic state of each remote vehicle at least partially in terms of a position of the remote vehicle measured relative to a respective lane of the road.

In an example, the instructions may further include instructions to execute a semi-autonomous feature of the host vehicle based on the kinematic states of the remote vehicles from the message.

A system includes a sensor with a field of view encompassing a road, a transceiver, and a computer communicatively coupled with the sensor and the transceiver. The computer is programmed to generate a message based on data from the sensor, and instruct the transceiver to transmit the message to a host vehicle traveling on the road. The message includes kinematic states of a plurality of remote vehicles traveling on the road. The message specifies the kinematic state of each remote vehicle at least partially in terms of a position of the remote vehicle measured relative to a respective lane of the road.

In an example, the system may further include an infrastructure component including the sensor, the transceiver, and the computer, and the infrastructure component may be fixed relative to the road.

In an example, the system may further include the host vehicle, and the host vehicle may include a vehicle computer programmed to actuate a component of the host vehicle based on the kinematic states of the remote vehicles from the message.

In an example, the message may include an identifier of the respective lane in which each remote vehicle is traveling.

In an example, the message may include a lateral offset of each remote vehicle relative to the respective lane in which the respective remote vehicle is traveling.

In an example, the message may include a width for each respective lane of the road.

In an example, the message may include a longitudinal offset between the host vehicle and at least one of the remote vehicles.

In an example, the message may include a path history for each remote vehicle.

In an example, the message may include a projected path for each remote vehicle.

In an example, the message may include a plurality of time gaps between pairs of the remote vehicles.

In an example, the computer may be further programmed to select the remote vehicles for the message based on proximity of the remote vehicles to the host vehicle.

In an example, the message may be unique to the host vehicle.

A method includes communicating a message from an infrastructure component to a host vehicle traveling on a road, the message including kinematic states of a plurality of remote vehicles traveling on the road; and actuating a component of the host vehicle based on the kinematic states of the remote vehicles from the message. The message specifies the kinematic state of each remote vehicle at least partially in terms of a position of the remote vehicle measured relative to a respective lane of the road.

In an example, the method further includes executing a semi-autonomous feature of the host vehicle based on the kinematic states of the remote vehicles from the message.

In an example, the method further includes generating the message based on data from a sensor of the infrastructure component, the sensor having a field of view encompassing the road.

In an example, the message may include an identifier of the respective lane in which each remote vehicle is traveling.

In an example, the message may include a lateral offset of each remote vehicle relative to the respective lane in which the respective remote vehicle is traveling.

In an example, the method further includes selecting the remote vehicles for the message based on proximity of the remote vehicles to the host vehicle.

With reference to FIG. 1, wherein like numerals indicate like parts throughout the several views, an infrastructure component 115 is located next to a road 120. The road 120 may have multiple lanes 125 in a single direction. One or more host vehicles 105 and one or more remote vehicles 110 may be traveling on the road 120. The term "host vehicle" is used herein to refer to a connected vehicle that is acting upon a message received from the infrastructure component 115. The term "remote vehicle" is used herein to refer to the other vehicles on the road 120 from the perspective of the host vehicle 105. If multiple connected vehicles capable of acting as host vehicles 105 are traveling on the road 120, each such vehicle is also a remote vehicle 110 from the perspective of the other connected vehicles.

A system 100 includes the infrastructure component 115 and the host vehicles 105. The system 100 is formed by one or more host vehicles 105 being within range of an infrastructure transceiver 135 of the infrastructure component 115. Which host vehicles 105 are part of the system 100 with the infrastructure component 115 may thus change dynamically over time.

The infrastructure component 115 may include an infrastructure computer 205 (shown in FIG. 2), at least one infrastructure sensor 130, and an infrastructure transceiver 135. The infrastructure component 115 may be fixed in position relative to the road 120, e.g., at a location next to the road 120. The road 120 may have multiple such infrastructure components 115 spaced from each other at regular intervals along the road 120.

Each infrastructure sensor 130 has a field of view F encompassing the road 120. The position of the infrastructure component 115 may provide the infrastructure sensors 130 with the fields of view F that encompass the road 120. For example, the infrastructure sensor 130 may be mounted to a body of the infrastructure component 115 at an elevated location that is near the road 120, and the infrastructure sensor 130 may be oriented downward toward the road 120. The regular spacing of the infrastructure components 115 may be such that the fields of view F of infrastructure sensors 130 on adjacent infrastructure components 115 overlap.

The position of the infrastructure component 115 puts the infrastructure transceiver 135 in range of the road 120. The regular spacing of the infrastructure components 115 may be such that the ranges of infrastructure transceivers 135 on adjacent infrastructure components 115 overlap. The host vehicles 105 thus switch from one infrastructure component 115 to the next infrastructure component 115 while traveling along the road 120.

Figure 2:
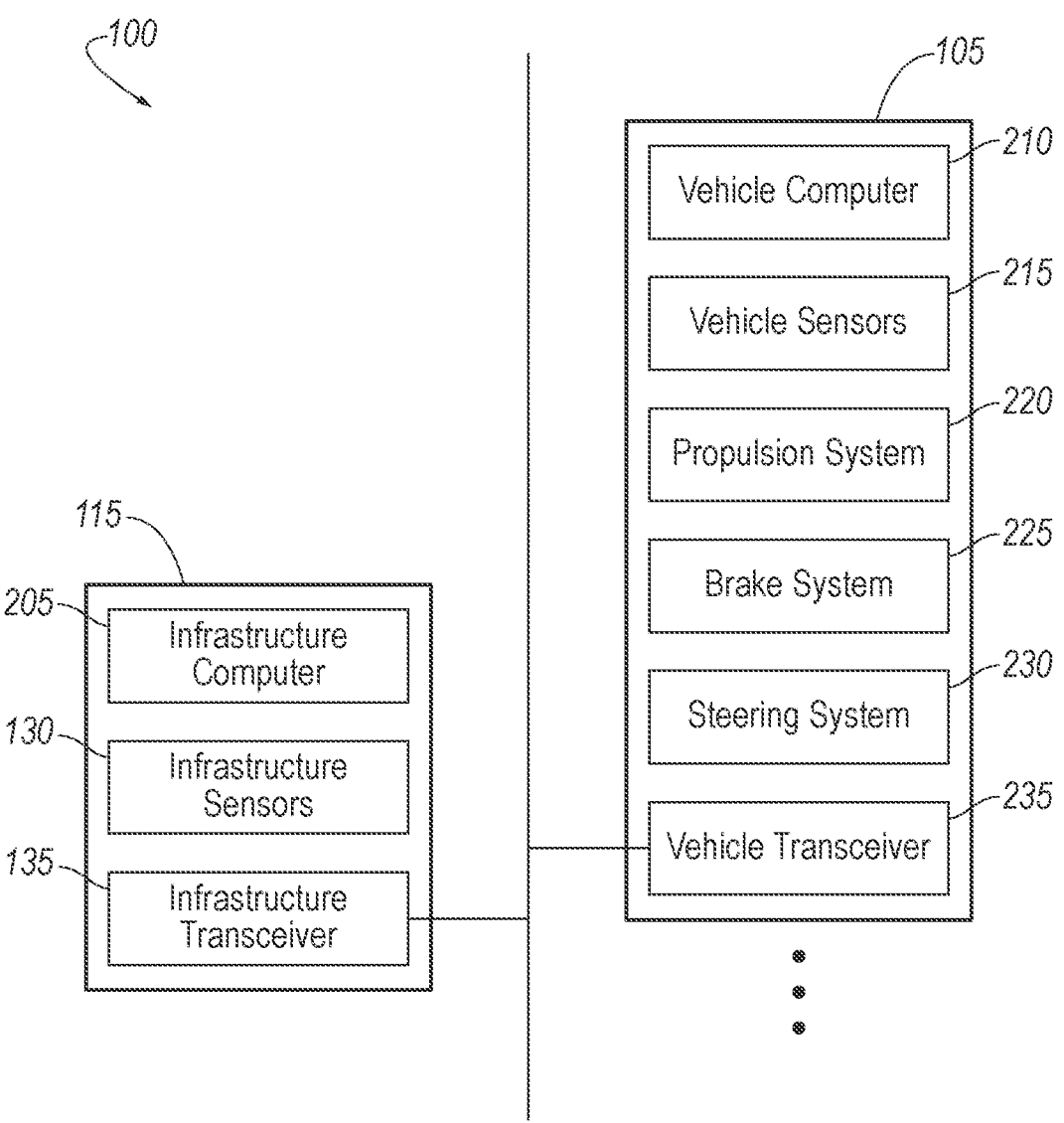
FIG. 2 is a block diagram of the system.

With reference to FIG. 2, the infrastructure component 115 may include the infrastructure computer 205, the at least one infrastructure sensor 130, and the infrastructure transceiver 135. The infrastructure computer 205 is communicatively coupled to the infrastructure sensor 130 and the infrastructure transceiver 135, e.g., via a bus within a body of the infrastructure component 115.

The infrastructure computer 205 is a microprocessor-based computing device, e.g., a generic computing device including a processor and a memory. The memory of the infrastructure computer 205 can include media for storing instructions executable by the processor as well as for electronically storing data and/or databases, and/or the infrastructure computer 205 can include structures such as the foregoing by which programming is provided. The infrastructure computer 205 can be multiple computers coupled together.

The infrastructure sensors 130 may detect the external world, e.g., objects and/or characteristics of surroundings of the infrastructure component 115, such as the vehicles 105, 110, road lane markings, traffic lights and/or signs, pedestrians, etc. For example, the infrastructure sensors 130 may include a camera. The camera can detect electromagnetic radiation in some range of wavelengths. For example, the camera may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type. For another example, the infrastructure sensors 130 may include a lidar, e.g., a scanning lidar device. The lidar detects distances to objects by emitting laser pulses at a particular wavelength and measuring the time of flight for the pulse to travel to the object and back. The lidar can be any suitable type for providing the lidar data on which the infrastructure computer 205 can act, e.g., spindle-type lidar, solid-state lidar, flash lidar, etc. For another example, the infrastructure sensors 130 may include a radar. The radar transmits radio waves and receives reflections of those radio waves to detect physical objects in the environment. The radar can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

The infrastructure transceiver 135 may be adapted to transmit signals wirelessly with the host vehicles 105 through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The infrastructure transceiver 135 may thus facilitate vehicle-to-infrastructure (V2I) communications. The infrastructure transceiver 135 may be one device or may include a separate transmitter and receiver.

The host vehicles 105 may each be any passenger or commercial automobile such as a car, a truck, a sport utility vehicle, a crossover, a van, a minivan, a taxi, a bus, etc. Each host vehicle 105 includes a vehicle computer 210, vehicle sensors 215, a propulsion system 220, a brake system 225, a steering system 230, and a vehicle transceiver 235. The vehicle computer 210 may be communicatively coupled to the vehicle sensors 215, the propulsion system 220, the brake system 225, the steering system 230, and the vehicle transceiver 235, e.g., via a vehicle network such as a controller area network (CAN) bus.

The vehicle computer 210 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 210 can thus include a processor, a memory, etc. The memory of the vehicle computer 210 can include media for storing instructions executable by the processor as well as for electronically storing data and/or databases, and/or the vehicle computer 210 can include structures such as the foregoing by which programming is provided. The vehicle computer 210 can be multiple computers coupled together.

The vehicle sensors 215 may provide data about operation of the host vehicle 105, for example, wheel speed, wheel orientation, and engine and transmission data (e.g., temperature, fuel consumption, etc.). The vehicle sensors 215 may detect the location and/or orientation of the host vehicle 105. For example, the vehicle sensors 215 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors 215 may detect the external world, e.g., objects and/or characteristics of surroundings of the host vehicle 105, such as the remote vehicles 110, road lane markings, traffic lights and/or signs, pedestrians, etc. For example, the vehicle sensors 215 may include radar sensors, ultrasonic sensors, scanning laser range finders, light detection and ranging (lidar) devices, and image processing sensors such as cameras.

The propulsion system 220 of the host vehicle 105 generates energy and translates the energy into motion of the host vehicle 105. The propulsion system 220 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 220 can include an electronic control unit (ECU) or the like that is in communication with and receives input from the vehicle computer 210 and/or a human operator. The human operator may control the propulsion system 220 via, e.g., an accelerator pedal and/or a gear-shift lever.

The brake system 225 is typically a conventional vehicle braking subsystem and resists the motion of the host vehicle 105 to thereby slow and/or stop the host vehicle 105. The brake system 225 may include friction brakes such as disc brakes, drum brakes, band brakes, etc.; regenerative brakes; any other suitable type of brakes; or a combination. The brake system 225 can include an electronic control unit (ECU) or the like that is in communication with and receives input from the vehicle computer 210 and/or a human operator. The human operator may control the brake system 225 via, e.g., a brake pedal.

The steering system 230 is typically a conventional vehicle steering subsystem and controls the turning of the wheels. The steering system 230 may be a rack-and-pinion system with electric power-assisted steering, a steer-by-wire system, as both are known, or any other suitable system. The steering system 230 can include an electronic control unit (ECU) or the like that is in communication with and receives input from the vehicle computer 210 and/or a human operator. The human operator may control the steering system 230 via, e.g., a steering wheel.

The vehicle transceiver 235 may be adapted to transmit signals wirelessly through any suitable wireless communication protocol, including the same protocol used by the infrastructure transceiver 135 and possibly other protocols. The vehicle transceiver 235 may be one device or may include a separate transmitter and receiver.

Returning to FIG. 1, the infrastructure computer 205 is programmed to receive data from the infrastructure sensors 130. For example, the data may be image data. The image data are a sequence of image frames of the field of view F of the camera. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view F of the sensor at the time that the image frame was recorded, can be specified in pixel dimensions or coordinates, e.g., an ordered pair of pixel distances, such as a number of pixels from a top edge and a number of pixels from a left edge of the image frame.

For another example, the data may be range data. The range data may be, e.g., a sequence of point clouds of the field of view F of a ranging sensor such as the lidar or radar. The points of the point cloud specify respective positions in the environment relative to the position of the ranging sensor. For example, the range data can be in spherical coordinates with the ranging sensor at the origin of the spherical coordinate system. The spherical coordinates can include a radial distance, i.e., a measured depth from the ranging sensor to the point measured by the ranging sensor; a polar angle, i.e., an angle from a vertical axis through the ranging sensor to the point measured by the ranging sensor; and an azimuthal angle, i.e., an angle in a horizontal plane from a horizontal axis through the ranging sensor to the point measured by the ranging sensor. The horizontal axis can be, e.g., along a vehicle-forward direction. Alternatively, the ranging sensor can return the points as Cartesian coordinates with the ranging sensor at the origin or as coordinates in any other suitable coordinate system, or the infrastructure computer 205 can convert the spherical coordinates to Cartesian coordinates or another coordinate system after receiving the range data.

The infrastructure computer 205 is programmed to generate a message to a host vehicle 105 based on the data from the infrastructure sensors 130. The message includes kinematic states of a plurality of the remote vehicles 110 traveling on the road 120. For the purposes of this disclosure, a "kinematic state" is defined as a mathematical description of the position and/or motion of an entity. The message may include, for each remote vehicle 110 included in the message, an identifier of the remote vehicle 110, dimensions of the remote vehicle 110, an identifier of the lane 125 in which the remote vehicle 110 is traveling, a width of the lane 125, a lateral offset of the remote vehicle 110 relative to the lane 125, an elevation offset of the remote vehicle 110, a path history for the remote vehicle 110, and a projected path for the remote vehicle 110, each of which will be described below. The message may also include a longitudinal offset between the host vehicle 105 and one of the remote vehicles 110, and one or more time gaps between pairs of the remote vehicles 110, which are also described below. For the purposes of this disclosure, "longitudinal" refers to a forward-rearward dimension relative to the vehicle 105, 110 or road 120, and "lateral" refers to a sideways dimension relative to the vehicle 105, 110 or road 120.

The message may be unique to a specific host vehicle 105. If multiple host vehicles 105 are traveling on the road 120, the infrastructure computer 205 may generate a message for each host vehicle 105, and the messages may have different content. For example, a set of the remote vehicles 110 selected for inclusion in the message may be different for different host vehicles 105. For another example, the longitudinal offset (described below) may be determined with respect to the host vehicle 105 for which the message is intended. The generation of the message will be described with respect to a single host vehicle 105, and the infrastructure computer 205 may repeat the steps for each host vehicle 105.

The infrastructure computer 205 may be programmed to select the remote vehicles 110 for the message based on proximity of the remote vehicles 110 to the host vehicle 105. For example, the infrastructure computer 205 may select each remote vehicle 110 within a threshold distance of the host vehicle 105. The threshold distance may be a radius, i.e., the infrastructure computer 205 may select each remote vehicle 110 within a circle centered on the host vehicle 105. Alternatively, the threshold distance may be a longitudinal distance, i.e., the infrastructure computer 205 may select each remote vehicle 110 within a rectangle extending forward and rearward from the host vehicle 105 by the threshold distance and extending from the right edge or shoulder of the road 120 to the left edge or shoulder of the road 120.

The infrastructure computer 205 may determine dimensions of each selected remote vehicle 110 and include the dimensions in the message. For example, the dimensions may include a length $L_{RV}$ and a width $W_{RV}$ of the remote vehicle 110. For example, the infrastructure computer 205 may determine the dimensions based on an extent of a cluster of points in the point cloud. For another example, the infrastructure computer 205 may determine the dimensions based on the pixel coordinates spanning an object identified as a remote vehicle 110 in the image data by performing a preset geometric transformation on the pixel coordinates. The geometric transformation may be determined based on the fixed position of the camera relative to the road 120 and on the topography of the road 120. The dimensions may be combined with a position of the remote vehicle 110 to define a virtual bounding box around the remote vehicle 110. The bounding box may be updated dynamically as the position of the remote vehicle 110 changes.

The infrastructure computer 205 may identify the lane 125 in which each selected remote vehicle 110 is traveling and include an identifier of the lane 125 in the message. For example, each lane 125 may be numbered, e.g., from left to right, and the infrastructure computer 205 may include the number of the identified lane 125 in the message. The computer may compare a center point C of the remote vehicle 110, e.g., a point halfway along the length $L_{RV}$ and halfway along the width $W_{RV}$ of the remote vehicle 110, to preset boundaries of the lanes 125. For image data, the infrastructure computer 205 may determine the center point C in pixel coordinates and compare the center point C with the boundaries of the lanes 125, also predefined in terms of pixel coordinates. For point clouds, the infrastructure computer 205 may compare the center point C in physical space with boundaries of the lanes 125 predefined in spatial dimensions.

The infrastructure computer 205 may include widths $W_L$ of the lanes 125 in the message. The width $W_L$ of each lane 125 may be prestored in the memory of the infrastructure computer 205. The message includes the widths $W_L$ of at least the lanes 125 in which the remote vehicles 110 are traveling and may include the widths $W_L$ of all the lanes 125. For example, the message may include the widths $W_L$ of each lane 125 paired with the respective identifiers of the lanes 125, or the message may include the width $W_L$ of a lane 125 paired with the remote vehicle 110 traveling in that lane 125.

The infrastructure computer 205 may determine position of each selected remote vehicle 110 measured relative to the lane 125 in which that remote vehicle 110 is traveling and include the position relative to the lane 125 in the message.

For example, the position of a selected remote vehicle 110 may be represented by a lateral offset $D_{lat}$ of the remote vehicle 110. The lateral offset $D_{lat}$ for a remote vehicle 110 may be defined with respect to the lane 125 identified for that remote vehicle 110. The lateral offset $D_{lat}$ defines a lateral position, i.e., left-right position, of the remote vehicle 110 in the lane 125. For example, the lateral offset $D_{lat}$ may be a distance from a side of the remote vehicle 110 to a boundary of the lane 125 on the same side. The side may be left or right, e.g., whichever is closer to the infrastructure component 115, i.e., left as shown in FIG. 1. For example, the infrastructure computer 205 may determine a distance along the lateral dimension from the left side of the remote vehicle 110, as indicated by the point cloud, to a known position of the left side of the lane 125. For another example, the infrastructure computer 205 may determine the distance between the left side of the remote vehicle 110, as described in pixel coordinates, and the left side of the lane 125, as indicated by known pixel coordinates, by performing the preset geometric transformation on the pixel coordinates. The position of the remote vehicle 110 relative to the lane 125, e.g., the lateral offset $D_{lat}$, may indicate whether the remote vehicle 110 is within a single lane 125 or straddling between lanes 125, e.g., during a lane change. The message may indicate that the remote vehicle 110 is crossing a boundary of a lane 125, e.g., if the lateral offset is negative $D_{lat}$ or if the sum of the lateral offset $D_{lat}$ and the width $W_{RV}$ of the remote vehicle 110 is greater than the width $W_L$ of the lane 125, i.e., $D_{lat}+W_{RV}>W_L$.

The infrastructure computer 205 may determine an elevation offset of each selected remote vehicle 110 relative to the lane 125 in which that remote vehicle 110 is traveling and include the elevation offset in the message. The elevation offset for a remote vehicle 110 may be defined with respect to the lane 125 identified for that remote vehicle 110. The elevation offset defines a vertical position of the remote vehicle 110 in the lane 125, e.g., a height of the roof or top of the remote vehicle 110. For example, the infrastructure computer 205 may determine a greatest vertical coordinate of the points of the point cloud constituting the remote vehicle 110 and, if the vertical coordinate is not relative to the ground, subtract a known height of the lane 125 at the position of the remote vehicle 110.

The infrastructure computer 205 may determine a path history for each selected remote vehicle 110 and include the path history in the message. The path history may define the position of the remote vehicle 110 over a previous duration of time or previous distance traveled. For example, the path history may be specified with a plurality of waypoints, i.e., previous positions of the remote vehicle 110 over a set of times. For another example, the path history may be specified by a curve such as a path polynomial fitted to the waypoints.

The infrastructure computer 205 may determine a projected path for each selected remote vehicle 110 and include the projected path in the message. The projected path is a prediction of a path that the remote vehicle 110 will follow from its current position. For example, the projected path may be specified with a plurality of waypoints or with a curve such as a path polynomial. The infrastructure computer 205 may determine the projected path, e.g., by fitting the path polynomial to the waypoints and tracing the path polynomial forward from the most recent waypoint.

The infrastructure computer 205 may determine a longitudinal offset $D_{long}$ between the host vehicle 105 and at least one of the selected remote vehicles 110, e.g., the remote vehicle 110 immediately in front of the host vehicle 105 in the same lane 125 as the host vehicle 105, and include the longitudinal offset $D_{long}$ in the message. The longitudinal offset $D_{long}$ defines a longitudinal position of the remote vehicle 110 relative to the host vehicle 105, e.g., a distance in the longitudinal dimension from host vehicle 105 to the remote vehicle 110. For example, the infrastructure computer 205 may determine a distance along the longitudinal dimension from the front end of the host vehicle 105 to the rear end of the remote vehicle 110, as indicated by the point cloud. For another example, the infrastructure computer 205 may determine the distance between the front end of the host vehicle 105 to the rear end of the remote vehicle 110, as described in pixel coordinates, by performing the preset geometric transformation on the pixel coordinates.

The infrastructure computer 205 may determine a plurality of time gaps between pairs of the selected remote vehicles 110 and include the time gaps in the message. For example, each pair of the remote vehicles 110 may be a first remote vehicle 110 and a second remote vehicle 110 that is immediately following the first remote vehicle 110 in the same lane 125 as the first remote vehicle 110. A "time gap" between a first vehicle 105, 110 and a second vehicle 105, 110 is an amount of time from a current time for the second vehicle 105, 110 to reach a current longitudinal position of the first vehicle 105, 110. For a specific pair of remote vehicles 110, the infrastructure computer 205 may determine the time gap by determining a longitudinal offset $D_{long,RV1\text{-}RV2}$ between the remote vehicles 110 in the manner described above and dividing that longitudinal offset $D_{long,RV1\text{-}RV2}$ by a speed $v_{RV2}$ of the trailing one of the remote vehicles 110, i.e., $\Delta t_{RV1\text{-}RV2} = D_{long,RV1\text{-}RV2}/v_{RV2}$.

The message including the foregoing data is communicated from the infrastructure computer 205 of the infrastructure component 115 to the vehicle computer 210 of the host vehicle 105. The infrastructure computer 205 is programmed to instruct the infrastructure transceiver 135 to transmit the message to the host vehicle 105. The vehicle computer 210 is programmed to receive the message via the vehicle transceiver 235.

The vehicle computer 210 is programmed to actuate a component of the host vehicle 105 based on the kinematic states of the selected remote vehicles 110 from the message, e.g., based on the identified lanes 125, the lateral offsets, the elevation offsets, the path histories, the projected paths, the longitudinal offsets, and/or the time gaps. The component may include one or more of the propulsion system 220, the brake system 225, and the steering system 230. For example, the vehicle computer 210 may execute a semi-autonomous feature of the host vehicle 105 based on the kinematic states of the remote vehicles 110 from the message, e.g., an advanced driver assistance system (ADAS) such as braking actuation, adaptive cruise control, lane-keeping assistance, automated lane-changing, or a combination of the foregoing. As one example, the vehicle computer 210 may actuate the propulsion system 220 and the brake system 225 to execute an adaptive cruise control based on the longitudinal offset. As another example, the vehicle computer 210 may actuate the brake system 225 to execute braking actuation in response to the projected path of a remote vehicle 110 passing into the same lane 125 as the host vehicle 105 within a threshold distance of the host vehicle 105. As another example, the vehicle computer 210 may actuate the steering system 230 when executing lane-keeping assistance based on the lateral offset. Upon determining that a remote vehicle 110 in an adjacent lane 125 is closer to a neighboring lane boundary than a threshold distance (as indicated by the lateral offset of the remote vehicle 110), the vehicle computer 210 may shift the host vehicle 105 to an opposite side of the lane 125 in which the host vehicle 105 is traveling from the remote vehicle 110. As another example, the vehicle computer 210 may actuate the steering system 230 to execute automated lane-changing based on the time gaps. Upon receiving a request to change lanes 125 from a current lane 125 to a target lane 125 adjacent to the current lane 125, the vehicle computer 210 may actuate the steering system 230 shift the host vehicle 105 to the target lane 125 between two remote vehicles 110 in response to the time gap between the two remote vehicles 110 being greater than a threshold (subject to other conditions being satisfied), and the vehicle computer 210 may refrain from actuating the steering system 230 to shift the host vehicle 105 to the target lane 125 between the two remote vehicles 110 in response to the time gap between the two remote vehicles 110 being less than the threshold.

Figure 3:
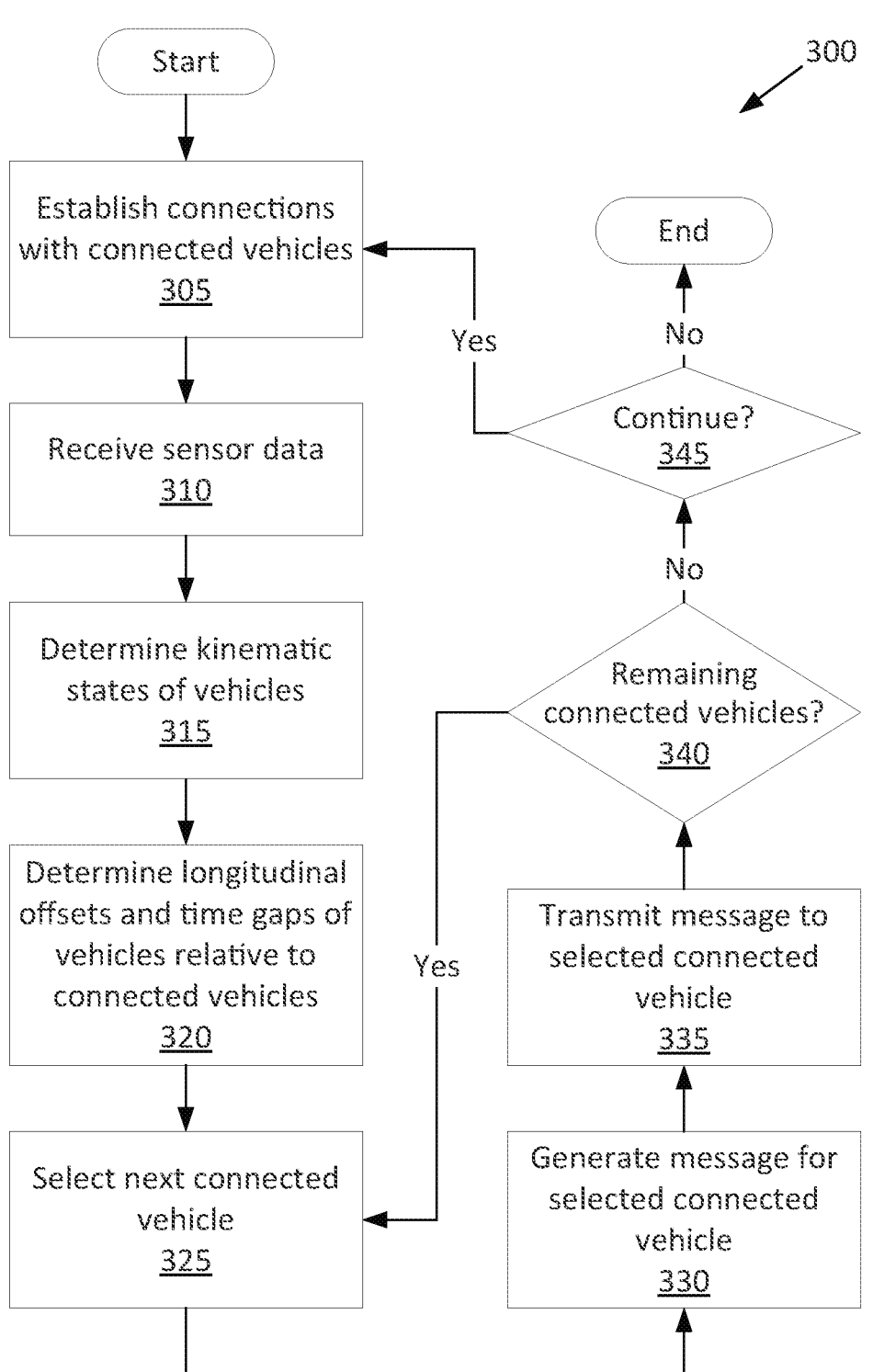
FIG. 3 is a flowchart of an example process of the infrastructure component communicating with the vehicles.

FIG. 3 is a flowchart illustrating an example process 300 for the infrastructure component 115 to communicate with the host vehicles 105. The memory of the infrastructure computer 205 stores executable instructions for performing the steps of the process 300 and/or programming can be implemented in structures such as mentioned above. As a general overview of the process 300, the infrastructure computer 205 establishes connections with the host vehicles 105, receives data from the infrastructure sensors 130, determines the kinematic states of the vehicles 105, 110, and determines the longitudinal offsets for the host vehicles 105 and time gaps of the pairs of remote vehicles 110. For each host vehicle 105, the infrastructure computer 205 generates a respective message and transmits the message to the host vehicle 105.

The process 300 begins in a block 305, in which the infrastructure computer 205 establishes connections between the infrastructure component 115 and each host vehicle 105. The connection may include negotiations between the infrastructure transceiver 135 and each vehicle transceiver 235. Each negotiation identifies the infrastructure transceiver 135 to the vehicle transceiver 235 and identifies the vehicle transceiver 235 to the infrastructure transceiver 135, permitting messages to be transmitted between the infrastructure transceiver 135 and the vehicle transceiver 235. The infrastructure computer 205 may establish respective connections with multiple host vehicles 105 if multiple host vehicles 105 are within range of the infrastructure transceiver 135.

Next, in a block 310, the infrastructure computer 205 receives data from the infrastructure sensors 130, as described above.

Next, in a block 315, the infrastructure computer 205 determines the kinematic states of the vehicles 105, 110 that are specific to individual vehicles 105, 110, e.g., the identified lane 125 of travel, the lateral offsets, the elevation offsets, the path histories, and the projected paths, as described above. The infrastructure computer 205 may also determine the dimensions of the vehicles 105, 110, as described above.

Next, in a block 320, the infrastructure computer 205 determines the kinematic states of the vehicles 105, 110 relative to others of the vehicles 105, 110, e.g., the longitudinal offsets and the time gaps, as described above. For example, the infrastructure computer 205 may determine the longitudinal offsets between each host vehicle 105 and the respective leading remote vehicle 110, and the infrastructure computer 205 may determine the time gaps between each pair of consecutive vehicles 105, 110 in the same lane 125.

Next, in a block 325, the infrastructure computer 205 selects a next host vehicle 105. For example, the infrastructure computer 205 may assign index values to the host vehicles 105 and proceed to a next index value in ascending order starting with a lowest of the index values.

Next, in a block 330, the infrastructure computer 205 generates the message for the selected host vehicle 105, as described above. The infrastructure computer 205 may select the remote vehicles 110, as described above, and include the data determined in the blocks 315 and 320 for the selected remote vehicles 110 in the message. The infrastructure computer 205 may include the longitudinal offset for the selected host vehicle 105 in the message.

Next, in a block 335, the infrastructure computer 205 instructs the infrastructure transceiver 135 to transmit the message to the selected host vehicle 105 via the connection established in the block 305.

Next, in a decision block 340, the infrastructure computer 205 determines whether messages have been transmitted to all the host vehicles 105. For example, the infrastructure computer 205 may determine whether the index value for the selected host vehicle 105 is the highest value of the index values. In response to determining that at least one host vehicle 105 remains to receive a message, the process 300 returns to the block 325 to proceed to the next host vehicle 105. Upon transmitting messages to all the host vehicles 105, the process 300 proceeds to a decision block 345.

In the decision block 345, the infrastructure computer 205 determines whether some condition for ending the process 300 has occurred, e.g., the infrastructure computer 205 is powering off, the infrastructure computer 205 is updating its software, no host vehicles 105 are within range of the infrastructure transceiver 135, etc. In the absence of such a condition, the process 300 returns to the block 305. Upon such a condition occurring, the process 300 ends.

Figure 4:
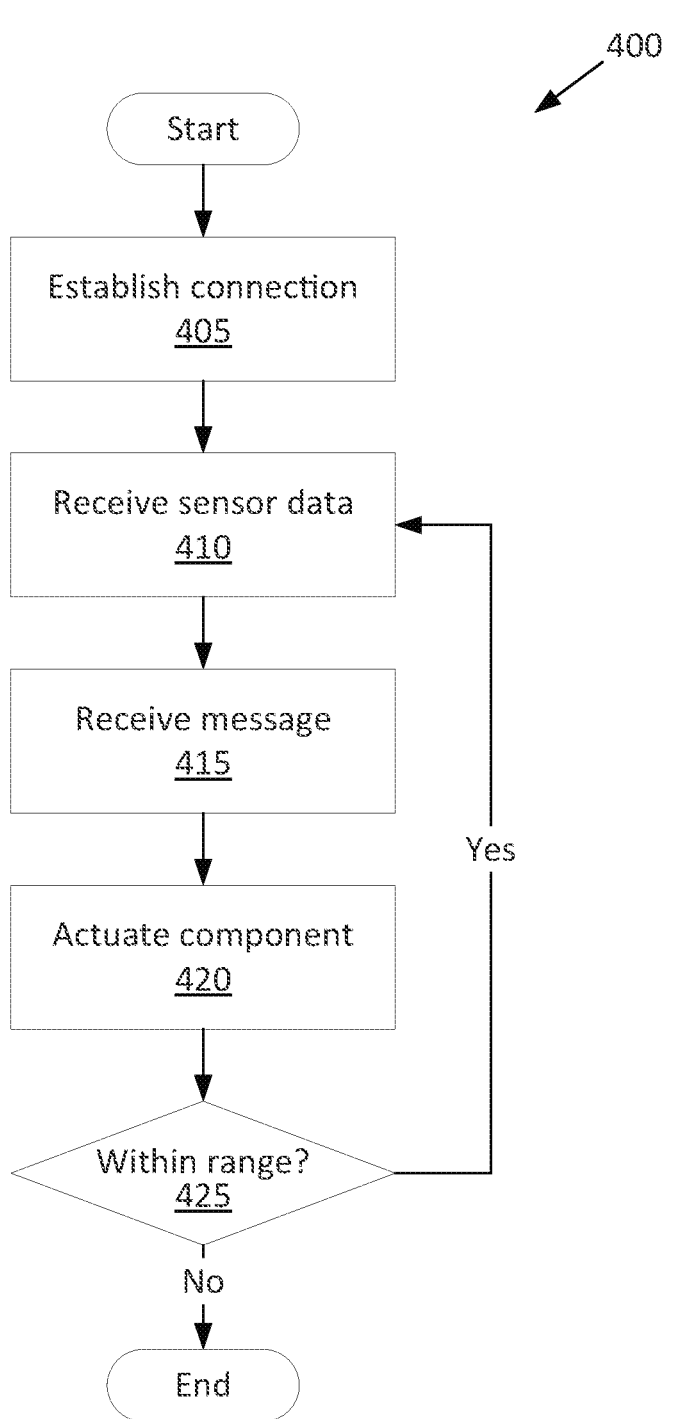
FIG. 4 is a flowchart of an example process of a vehicle computer operating the vehicle based on the communication with the infrastructure component.

FIG. 4 is a flowchart illustrating an example process 400 for the vehicle computer 210 to operate the host vehicle 105 based on communication with the infrastructure component 115. The memory of the vehicle computer 210 stores executable instructions for performing the steps of the process 400 and/or programming can be implemented in structures such as mentioned above. As a general overview of the process 400, the vehicle computer 210 establishes a connection with the infrastructure component 115. For as long as the host vehicle 105 remains within range of the infrastructure transceiver 135, the vehicle computer 210 receives data from the vehicle sensors 215, receives the message from the infrastructure component 115, and actuates the components of the host vehicle 105 based on data from the message.

The process 400 begins in a block 405, in which the vehicle computer 210 establishes a connection with the infrastructure computer 205, as described above with respect to the block 305 of the process 300.

Next, in a block 410, the vehicle computer 210 receives data from the vehicle sensors 215.

Next, in a block 415, the vehicle computer 210 receives the message from the infrastructure computer 205 including the kinematic states of the remote vehicles 110, as described above.

Next, in a block 420, the vehicle computer 210 actuates a component of the host vehicle 105, e.g., the propulsion system 220, the brake system 225, and/or the steering system 230, based on the kinematic states of the remote vehicles 110 from the message and based on the data from the vehicle sensors 215, as described above.

Next, in a decision block 425, the vehicle computer 210 determines whether the host vehicle 105 is within range of the infrastructure transceiver 135. For example, the vehicle computer 210 may determine a signal strength to the infrastructure transceiver 135 or determine whether one of the messages has been received from the infrastructure transceiver 135 within a threshold time. In response to the host vehicle 105 remaining within range of the infrastructure transceiver 135, the process 400 returns to the block 410 to continue receiving data from the vehicle sensors 215 and the infrastructure transceiver 135. Upon leaving the range of the infrastructure transceiver 135, the process 400 ends. If the host vehicle 105 is traveling on a road 120 with multiple infrastructure components 115, the process 400 may restart each time the host vehicle 105 is within range of a new infrastructure component 115.

In general, the computing systems and/or devices described may employ any of a number of computer operating systems, including, but by no means limited to, versions and/or varieties of the Ford Sync® application, AppLink®/Smart Device Link middleware, the Microsoft Automotive® operating system, the Microsoft Windows® operating system, the Unix® operating system (e.g., the Solaris® operating system distributed by Oracle® Corporation of Redwood Shores, California), the AIX UNIX operating system distributed by International Business Machines of Armonk, New York, the Linux® operating system, the Mac® OSX and iOS operating systems distributed by Apple® Inc. of Cupertino, California, the BlackBerry® OS distributed by Blackberry®, Ltd. of Waterloo, Canada, and the Android® operating system developed by Google®, Inc. and the Open Handset Alliance®, or the QNX® CAR Platform for Infotainment offered by QNX® Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab®, Simulink®, Stateflow®, Visual Basic®, Java Script®, Python®, Perl®, HTML, etc. Some of these applications may be compiled and executed on a virtual machine, such as the Java® Virtual Machine, the Dalvik® virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer.

Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A system comprising:
a sensor with a field of view encompassing a road;
a transceiver; and
a computer communicatively coupled with the sensor and the transceiver;
the computer programmed to:
generate a message based on data from the sensor, the message including kinematic states of a plurality of remote vehicles traveling on the road, the message specifying the kinematic state of each remote vehicle at least partially in terms of a position of that remote vehicle measured relative to a respective lane of the road, the message including a lateral offset of each remote vehicle, each lateral offset being measured from that remote vehicle to a boundary of the respective lane in which that remote vehicle is traveling; and
instruct the transceiver to transmit the message to a host vehicle traveling on the road.

2. The system of claim 1, further comprising an infrastructure component including the sensor, the transceiver, and the computer, the infrastructure component being fixed relative to the road.

3. The system of claim 1, further comprising the host vehicle, the host vehicle including a vehicle computer programmed to actuate a component of the host vehicle based on the kinematic states of the plurality of remote vehicles from the message.

4. The system of claim 1, wherein the message includes an identifier of the respective lane in which each remote vehicle is traveling.

5. The system of claim 1, wherein the message includes a width for each respective lane of the road.

6. The system of claim 1, wherein the message includes a longitudinal offset between the host vehicle and at least one of the plurality of remote vehicles.

7. The system of claim 1, wherein the message includes a path history for each remote vehicle.

8. The system of claim 1, wherein the message includes a projected path for each remote vehicle.

9. The system of claim 1, wherein the message includes a plurality of time gaps between pairs of the plurality of remote vehicles.

10. The system of claim 1, wherein the computer is further programmed to select the plurality of remote vehicles for the message based on proximity of the plurality of remote vehicles to the host vehicle.

11. The system of claim 1, wherein the message is unique to the host vehicle.

12. A method comprising:
communicating a message from an infrastructure component to a host vehicle traveling on a road, the message including kinematic states of a plurality of remote vehicles traveling on the road, the message specifying the kinematic state of each remote vehicle at least partially in terms of a position of that remote vehicle measured relative to a respective lane of the road, the message including a lateral offset of each remote vehicle, each lateral offset being measured from that remote vehicle to a boundary of the respective lane in which that remote vehicle is traveling; and
actuating a component of the host vehicle based on the kinematic states of the plurality of remote vehicles from the message.

13. The method of claim 12, further comprising executing a semi-autonomous feature of the host vehicle based on the kinematic states of the plurality of remote vehicles from the message.

14. The method of claim 12, further comprising generating the message based on data from a sensor of the infrastructure component, the sensor having a field of view encompassing the road.

15. The method of claim 12, wherein the message includes an identifier of the respective lane in which each remote vehicle is traveling.

16. The method of claim 12, further comprising selecting the plurality of remote vehicles for the message based on proximity of the plurality of remote vehicles to the host vehicle.

17. A computer comprising a processor and a memory, the memory storing instructions executable to:

receive a message including kinematic states of a plurality of remote vehicles traveling on a road, the message specifying the kinematic state of each remote vehicle at least partially in terms of a position of that remote vehicle measured relative to a respective lane of the road, the message including a lateral offset of each remote vehicle, each lateral offset being measured from that remote vehicle to a boundary of the respective lane in which that remote vehicle is traveling; and actuate a component of a host vehicle based on the kinematic states of the plurality of remote vehicles from the message, wherein the host vehicle is traveling on the road.

18. The computer of claim 17, wherein the instructions further include instructions to execute a semi-autonomous feature of the host vehicle based on the kinematic states of the plurality of remote vehicles from the message.

* * * * *